United States Patent

Segen

Patent Number: 6,072,504
Date of Patent: Jun. 6, 2000

[54] METHOD AND APPARATUS FOR TRACKING, STORING, AND SYNTHESIZING AN ANIMATED VERSION OF OBJECT MOTION

[75] Inventor: Jakub Segen, Fair Haven, N.J.

[73] Assignee: Lucent Technologies Inc., Murray Hill, N.J.

[21] Appl. No.: 08/880,092

[22] Filed: Jun. 20, 1997

[51] Int. Cl.[7] .................................................. G06T 15/70
[52] U.S. Cl. .............................................................. 345/474
[58] Field of Search ..................................... 345/473–475; 348/46–48; 434/247–252; 382/154, 107

[56] References Cited

U.S. PATENT DOCUMENTS

| | | | |
|---|---|---|---|
| 5,513,854 | 5/1996 | Daver | 364/410.1 |
| 5,697,791 | 12/1997 | Nashner et al. | 434/247 |
| 5,745,126 | 4/1998 | Jain et al. | 348/42 |

OTHER PUBLICATIONS

A Camera Based System for Tracking People in Real Time, Proceedings of International Conference on Pattern Recognition, Vieuna, Austria, Aug. 1996, by Jakub Segen and Sarma Pingali, Bell Laboratories, Lucent Technologies.

Three–Dimensional Computer Vision, MIT Press, O. Faugeras 1993.

*Primary Examiner*—Mark R. Powell
*Assistant Examiner*—Thu Nguyen
*Attorney, Agent, or Firm*—Gibbons, Deldeo, Dolan, Griffinger & Vecchione

[57] ABSTRACT

The specification relates to a method and apparatus for tracking object position during active segments of motion monitored from a plurality of video cameras, repetitively sampling object position, representing various object trajectories during active segments as equations, and synthesizing an animated version of the motion of the object from the representative equations. The present description is described in the context of synthesis of an animated version of a tennis game, although a representation of object motion of any sort is equally applicable, if the object motion is capable of being reduced to the form of an equation or series of equations. In a further enhancement, player position, player extremities, and player controlled objects (such as a racquet) are also tracked and sampled and utilized to provide an animation more faithfully reproducing player position, player motion and other game parameters.

24 Claims, 2 Drawing Sheets

METHOD AND APPARATUS FOR TRACKING, STORING, AND SYNTHESIZING AN ANIMATED VERSION OF OBJECT MOTION

FIELD OF THE INVENTION

This invention relates generally to video imaging, and, in particular, to tracking and processing video images from multiple sources and reducing video motion information into a mathematical representation of the tracked images.

BACKGROUND OF THE INVENTION

Television sporting event broadcasts add excitement and an added dimension of participation through the use of slow motion and normal speed replay of an especially exciting or controversial portion of the game or event. For example, during a televised tennis match, viewers expect to see a sequence of spectacular play repeated, whether in slow motion or normal speed, with televised commentary accompanying and describing the replay. However, because of the finite number of cameras used to videotape an event, the best angle with which to observe a particular portion of play is not always available for replay. Unavailability of a well placed camera becomes increasingly vexing to viewers during an especially controversial play, viewers frequently desiring to observe a controversial play or game sequence from a viewing position which best represents the controversial aspects of the play or sequence.

Additionally, several sports also permit a review of a controversial officiating call through the observed replay of game video. A similar problem with camera location can occur in these instances. A view of the action leading to the controversial call may not have been captured by any video camera, game officials or players obscuring the view of the action required to make a determination. The difficulty imposed by the absence of an appropriate view during these instances is amplified in those cases when no official was in a suitable position to make a reasonably based judgment call as to what had transpired and the official is forced to guess as to what occurred.

Further, sports such as auto racing and downhill skiing have incorporated video cameras within a participant's equipment to allow for a televised depiction of a "participant's eye view" as a sporting event unfolds. Because of limitations with the weight and size of video equipment, and the restrictive aspects therein, this technology has not readily lent itself to sports in which a player's speed, quickness, and agility, such as baseball, basketball, and tennis, are of paramount importance. The ability to televise a view of an athletic endeavor from a player's perspective would add another level of excitement to a televised sporting event. Therefore, what is needed is the ability reduce the variables associated with an actual live action game to a data bank and to reconstruct a synthetic animated version of a desired portion of active play from the data collected.

SUMMARY OF THE INVENTION

The present invention is a method and apparatus for creating a synthetic animated version of a live game in which the trajectory of a ball, puck, or other object can be described through a series of equations. The present invention utilizes a plurality of cameras to track ball position with at least two cameras while periods of active play are in progress, and transmits video signals to a digital processor which samples a two-dimensional position from each camera and triangulates an actual three-dimensional ball position in relation to a field of play. Three-dimensional ball positions are grouped on-line or off-line, utilizing a digital processor, into segments of unimpeded motion. A segment of unimpeded motion is a collection of ball positions during which ball motion is not acted upon by a player, obstruction, or playing surface. Each segment of unimpeded motion is fit with an equation descriptive of its trajectory and a collection of equations representing each segment of unimpeded motion are temporarily stored.

The beginning and end of each segment of unimpeded motion is punctuated with a point of interaction. A point of interaction is represented by a three-dimensional ball position at a time when a player, obstruction, or playing surface intervenes to alter the trajectory from the previous segment of unimpeded motion. In an embodiment of the present invention utilized within a tennis game, points of interaction are those ball positions where the tennis ball changes trajectory due to being struck with a player's racquet, due to striking the net, or due to striking the tennis court. However, factors such as air resistance and ball spin can be represented by an equation of a differentiable function approximating ball position within one continuous segment of unimpeded motion, and are therefore not considered points of interaction.

Points of interaction and the equations describing segments of unimpeded motion are both temporarily stored at a buffer or queue associated with an attendant storage device. The digital processor is programmed to make a determination as to whether each specific point of interaction is attributable to player intervention (e.g.—striking the ball with a racquet) or whether the point of interaction is attributable to a collision with the playing field or fixed obstructions (e.g.—the tennis court and net respectively). The determination is made on-line or off-line by a comparison of ball trajectories with respect to possible causes for a change of trajectory. If a specific point of interaction is attributable to player intervention, that point of interaction is flagged by the program running at a digital processor and stored to trigger an animated player interaction with the ball at that specific point of interaction during the creation of a synthetic animation of the actual live action game. An animation program is utilized to synthesize the animation. The animation program is resident at the digital processor or compatible computing equipment for near instantaneous synthetic reproduction, or game variables can be stored for future use. The animation program animates appropriate ball motion, player interaction, racquet speed and angle, and other variables consistent with game physics and human ergonomics. Animation techniques utilized in the present invention are equivalent to those used in the design of video games, and are well known to those skilled in the art. Additional realism is added to a synthesized animated game when player position, player extremities, and racquet position are further monitored, tracked, stored and utilized in conjunction with previously described variables for animation of the synthesized game.

Several uses exist for synthesis of an animated game based on a live action game which is able to be reduced and stored in a highly compressed form. One such use is in conjunction with live televised broadcasts of sporting events. A synthesized replay of interesting sequences of game play, rendered in high quality animation, are used in conjunction with conventional video of the event. A synthesized replay can be shown at normal speed, high speed, or in slow motion. The point of view of a replay is designated from any desired position or angle. Thus, in effect, a virtual camera is created which is operable to provide particularly insightful virtual camera pseudo-locations for a synthesized animation of a game or game sequence. The virtual camera is also operable as if it were a moving camera, its pseudo-path variable even within a sequence of play. One especially interesting possibility is to direct the virtual camera to synthesize an animated version of a game from a pseudo-location corresponding to eyes of a player.

The present invention may also be utilized as an officiating tool in those sports that allow review of an official's ruling or determination pertaining to a controversial officiating call. Actual video is still contemplated as being used, but in those situations when an appropriate view from a video camera is not available, the present invention is utilized and a pseudo-location is prescribed which allows the best view of the controversial game or match segment.

The present invention is also applicable for use over the Internet. Current modems are more than adequate to transmit the tracking data associated with a synthetic game. Tracking data is transmitted to Internet servers made available to subscribers. The tracking data can be broadcast over the Internet live, or in the alternative, a subscriber can access the database containing the tracking data at any convenient time. Another embodiment of the present invention further transmits a "play-by-play" audio track and calculated statistics (such as ball speed, player speed, distance traveled by player during a game, etc.) along with the tracking data used to synthesize the animated game. Software to support the synthesis of an animated game from the transmitted tracking data is operable at the PC of the subscriber user. Users are able to interact with the animation, that is, a user is able to designate a specific virtual camera's pseudo-location or designate a virtual camera view of the game from the perspective of one of the players.

Another embodiment of the present invention stores the tracking data from a plurality of games on a suitable storage device (such as a floppy disk or CD-ROM). A user installs a viewer program on a PC and accesses a desired synthetic game file from the floppy disk or CD-ROM. Again, users are able to interact with the animation, that is, a user is able to designate a specific virtual camera's pseudo-location or designate a virtual camera view of the game from the perspective of one of the players.

Although the present invention is particularly well suited for the synthetic animation of a tennis game, and is so described with respect to this application, it is equally applicable for use with any game in which the trajectory of a ball, puck, or other object can be reduced to the form of an equation or series of equations, or in other instances when object motion can be reduced to the form of an equation or series of equations.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the following illustrative embodiments of the present invention are presented as comprising individual functional blocks (including functional blocks labeled as "processors" or "microprocessors." The functions these blocks represent may be provided through the use of either shared or dedicated hardware, including, but not limited to, hardware capable of executing software. For example, the functional steps presented in FIG. 2 may be accomplished by a single shared processor, or in the alternative, the functional steps may be accomplished through a plurality of processors each performing one or more of the functional steps disclosed. Use of the terms "processor" or "microprocessor" should not be construed to refer exclusively to hardware capable of executing software. Illustrative embodiments of the present invention may comprise microprocessor and/or digital signal processor ("DSP") hardware, read-only memory ("ROM") for storing software performing the operations discussed below, and random access memory ("RAM") for storing intermediate calculations and final results. Very large scale integration ("VLSI") hardware embodiments, as well as custom VLSI circuitry in combination with a general purpose DSP circuit, may also be provided.

Figure 1:
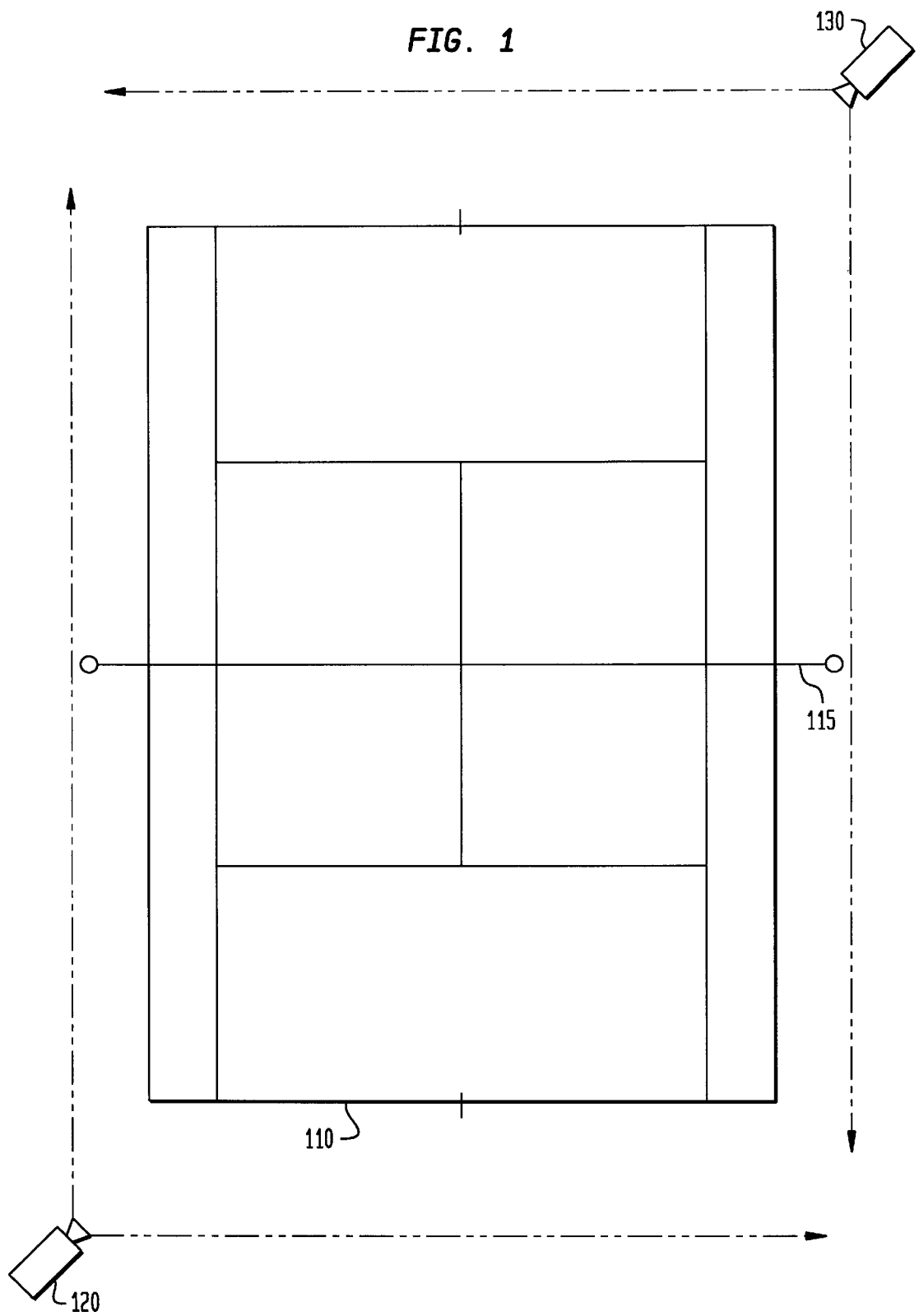
FIG. 1 is a top view pictorial illustrating one embodiment of camera location in relation to a field of play, implemented within a two camera system and in accordance with the present invention.
Figure 2:
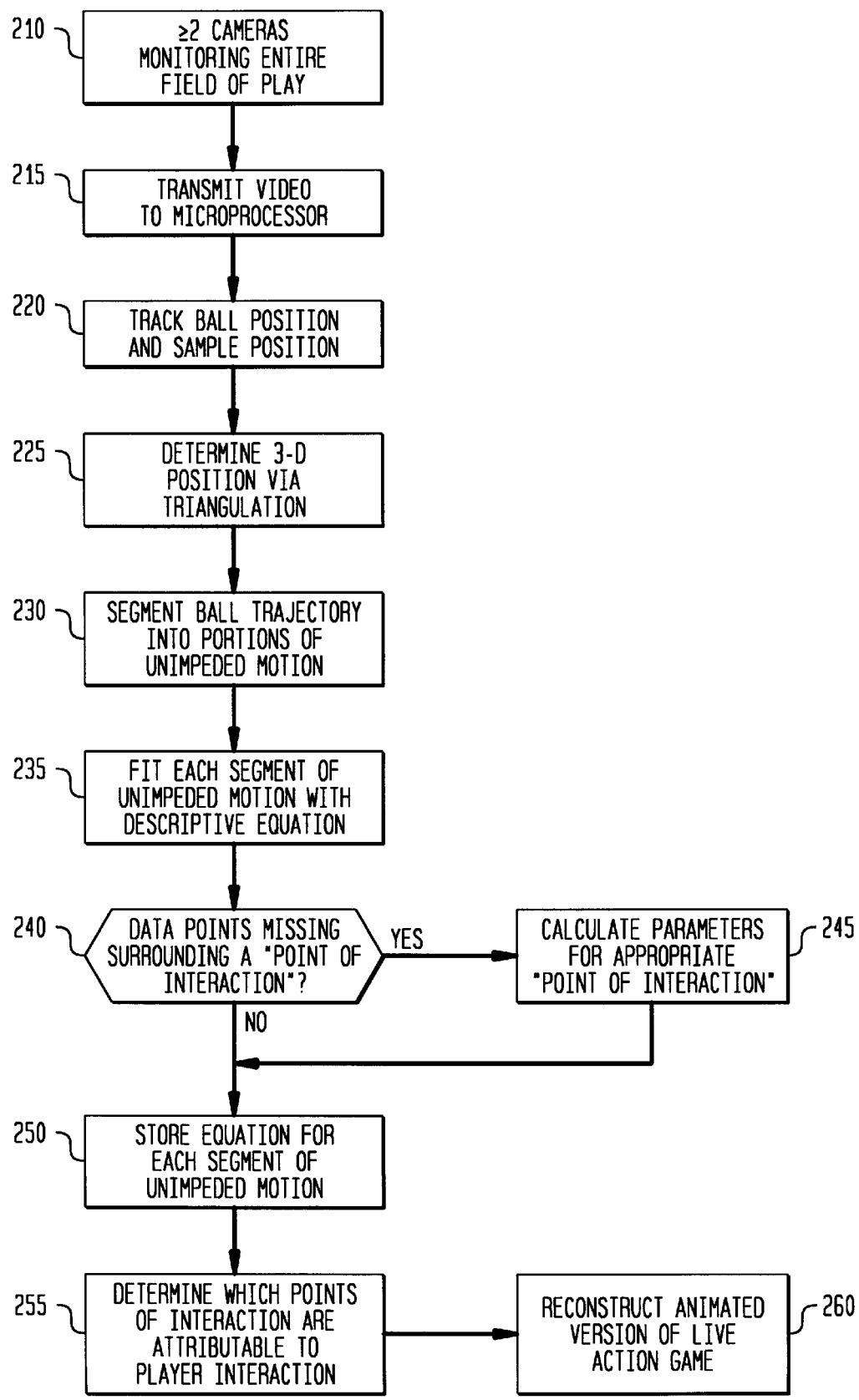
FIG. 2 is an exemplary flow chart illustrating the processes involved in the implementation of one embodiment of the present invention.

FIGS. 1 and 2, and the accompanying detailed description contained herein, are to be used as illustrative exemplary embodiments of the present invention, and should not be construed as the only manner of practicing the present invention. Numerous modifications and alternative embodiments of the invention will be apparent to those skilled in the art in view of the following description. Details of the structure may be varied substantially without departing from the spirit of the invention.

FIG. 1 is a top view pictorial illustrating one embodiment of camera locations in relation to a field of play, implemented within a two camera system and in accordance with the present invention. The field of play shown in FIG. 1 is that of a tennis court 110 and the present invention will be described within the context of a tennis game, although the present invention may be utilized to synthesize an animated version of any game in which the trajectory of a ball, puck, or other object can be reduced to the form of an equation or series of equations, or in other instances when object motion can be reduced to the form of an equation or series of equations. A top view of the lines forming court boundaries associated with a tennis court (110) are illustrated as well as the net (115) at mid-court. Camera #1 120 and Camera #2 130 are each operable to view the entire field of play, including a height above the two-dimensional surface of play 110 that the tennis ball is not expected to exceed during play. Although no prescribed camera location is mandatory, criteria for selecting camera position include (i) positioning cameras to obtain the greatest resolution, that is, the greatest number of pixels for a given field of view, (ii) selecting camera location based on practical requirements such as accessibility or non-interference with the play of the game, (iii) positioning each camera so as to view the entire field of play, (iv) placing cameras in positions which maximize the contrast between the object to be tracked, a tennis ball in this example, and the background, and (v) placing cameras in positions which minimize the amount of non-game motion in the background of a camera's field of view, in order that interference with the ability to track tennis ball position and player position are minimized.

In an embodiment of the present invention which utilizes more than two cameras, it is not necessary that each camera is operable to view the entire field of play. However, at least two cameras are able to track the tennis ball position at each possible ball location within the field of play. Maintaining a system wherein ball position is displayed at every possible location within the field of view of at least two cameras ensures that triangulation can be used to determine ball position in three-dimensional space. An advantage of using more than two cameras is that each camera maintains a smaller field of view. Therefore, a constant number of pixels are used to monitor a smaller field of view and greater resolution and tracking ability are achieved.

Another advantage of using more than two cameras is evident when a ball trajectory path is directly along an imaginary line between two cameras in a two camera embodiment. Since there is no lateral component of ball motion discernible by either video display, lateral data is unobtainable and ball position in three-dimensional space cannot be determined. In a system with three or more cameras, a ball trajectory path directly between two cameras is not fatal, since a third camera is also monitoring ball position and trajectory. Triangulation, based on data from this third camera and any other camera (including one of the two cameras between which the ball is traveling), is viable and therefore ball position in three-dimensional space is determinable.

The relative height of individual camera placement is variable with respect to several embodiments. One embodiment of the present invention maintains video cameras at or near court level. Placing cameras at or near court level allows for quick setup and breakdown of video equipment prior to and after use with the present invention. Another embodiment of the present invention utilizes elevated cameras, either attached to poles, placed on scaffolding, or mounted on an electric or hydraulic manlift. Elevated cameras allow a camera to incorporate a greater portion of a playing field within a fixed focal length and minimize non-game background motion by eliminating a portion or the entire background of audience, spectators, and/or support crew and staff. Therefore, tracking ball and player motion during game play is performed with a greater degree of accuracy with the use of elevated cameras. In yet another embodiment of the present invention, camera position is not fixed but variable, that is cameras are movable during periods of active play. Implementing the present invention as a system utilizing movable cameras allows for the use of fewer cameras than a system not utilizing movable cameras.

FIG. 2 is an exemplary flow chart illustrating the processes involved in the implementation of one embodiment of the present invention. In step 210, a plurality of video cameras are arranged around the field of play in such a manner that at least two cameras are operable to view ball position at any point within the boundaries of the field of play and above the field of play to a height over which a ball in play is not expected to exceed. Camera video speed determines the quantity of frames per second captured by each camera. The greater the quantity of frames per second, the greater the available sampling rate of ball position and the greater the tracking accuracy of the present invention. Prior to commencement of processing a live action game in accordance with the present invention, each camera must be calibrated with respect to its field of view and known or measured field parameters. For example, after a field of view is established with Camera #1, court dimension parameters (based on known court dimensions and known or measured net height) are related to specific pixels of Camera #1 output within a program running on a digital processor (e.g.—a microprocessor, microcircuitry, or a digital signal processor). The program performing the necessary calculations and assignments may be implemented as a software and/or hardware combination running on a personal computer, a mini-computer, or some other general computing environment; or the program may run on a specially designed IC chip, microprocessor, or other hardware implementation, such as ASIC. A set of equations relating three-dimensional points in court coordinates to two-dimensional points (pixels) within the field of view of Camera #1 are computed using methods well known to those skilled in the art. One example for translating three-dimensional position to two-dimensional position is described in a book entitled "Three-Dimensional Computer Vision," O. Faugeras, MIT Press, 1993. The process is repeated for Camera #2 and each subsequent camera utilized. Therefore each camera utilized has a function mapped from known court (and net) positions to the position of pixels associated with a specific camera's two-dimensional output.

Once each camera has been calibrated, a live action game may commence. Each of the two or more cameras associated with the present invention transmits live action game video to a system digital processor running the corresponding software program, or a portion of the corresponding software program, in accordance with step 215. The processor tracks the position of the ball from the perspective of its pixel coordinates from each camera and samples that position, in accordance with step 220. Tracking a moving object against a relatively stationary background is well known to those skilled in the art, as is described in a book entitled "Three-Dimensional Computer Vision," O. Faugeras, MIT Press, 1993, for example. In one embodiment of the present invention, sampling the tracked ball position is performed at the microprocessor for each frame transmitted from each camera because a high sampling frequency results in an improved approximation of actual ball position when an animated facsimile of the live game is synthesized. In another embodiment of the present invention, sampling is performed less frequently. Sampling once per n frames, where n is an integer, is an alternative when a high degree of accuracy is not required, when the system's data storage capacity or the data transmission capacity limits are approached, or when the frame speed of the live video is much greater than the required sampling speed based on the anticipated maximum velocity of the tracked object. Conversely, a high speed video camera, because it transmits a greater number of frames per second, will therefore provide an improved approximation of actual ball position when an animated facsimile of the live game is synthesized.

In step 225, three-dimensional ball positions are determined by a digital processor which triangulates the relative positions of the tracked ball's pixel coordinates from concurrent frames from each of the cameras able to track the ball. The result is temporarily stored in system buffer memory. This process of triangulation is reperformed for each of the sampled positions in time, each result being temporarily stored in buffer memory. The result is a sequence of time dependent three-dimensional positions for the tracked ball. The sequence of tracked ball positions is examined by a program running on a digital processor, in accordance with step 230, for segments of unimpeded motion. Segments of unimpeded motion are those portions of ball trajectory between points of alteration. Points of alteration are those points at which the ball in play strikes the court surface, the net, or a player's racquet, and which mark a change in the equation used to describe the previous motion of the ball or a change in the ball's velocity vector. An equation is best fit to the data contained in each segment of unimpeded motion, in accordance with step 235, the equation describing motion between points of alteration. The equation used to describe trajectory during a segment of unimpeded motion can include the effects of air resistance and ball spin, if desired, depending upon the degree of accuracy required during reproduction of an animated game. One embodiment of the present invention represents the trajectory equation as the coefficients of a polynomial. A marked departure from an expected sample position based on a current trajectory's equation indicates that a point of alteration has occurred. This point of alteration is due to the ball's interaction with the court surface (bouncing off of the surface), the ball striking the net, or a player striking the ball with a racquet. A point of alteration indicates the beginning of a new segment of unimpeded motion, which is described by a new trajectory equation, and is valid until the next point of alteration occurs.

One exemplary embodiment of the present invention utilizes the following method for segmenting ball positions into segments of unimpeded motion and fitting equations to those segments, in accordance with steps 230 and 235. A sequence of actual three-dimensional points for ball position in time is:

$$H = V(T_1), V(T_2), \ldots, V(T_n)$$

which correspond to respective moments in time:

$$T_1, T_2, \ldots, T_n$$

where each position in time has a three-dimensional representation of:

$$V(T_i) = [V_x(T_i), V_y(T_i), V_z(T_i)]$$

Trajectory segments are described by polynomial equations of order K, where K is equal to or greater than 2. The first k points of sequence H, where k>K, are separately fit to polynomials of order K for each axis component of X, Y, and Z; thus obtaining a vector function in time:

$$V'(T) = [V_x'(T), V_y'(T), V_n'(T)]$$

The polynomial fit is accomplished utilizing the method of least squares, which is a method well known to those skilled in the art. Calculation of a per-point square error is accomplished by application of:

$$E = \{\|V'(T_1) - V(T_1)\| + \|V'(T_2) - V(T_2)\| + \ldots + \|V'(T_k) - V(T_k)\|\}/(k)$$

where each minus sign is a representation for vector subtraction, and $$\|V\| = [V_x * V_x + V_y * V_y + V_z * V_z]$$

If the value of E is greater than or equal to a given threshold value, $THR_1$, then the first point from H is rejected (i.e.—treated as a missing point) and the above calculations are repeated for a second point of H. This process is continued until a set of k sequential points are found for which E is less than $THR_1$. The first such point marks the beginning of a new segment of unimpeded motion. Next, the square error, E, is computed for the $(k+1)_{th}$ point, with respect to the function V'(T), and add this point to the segment of unimpeded motion, if E is less than a threshold value, $THR_2$. This procedure is applied to the $(k+2)_{th}$ point and subsequent points, as long as E is less than $THR_2$. The first point, r, for which E is not less than $THR_2$ marks the end of the current segment of unimpeded motion. The above procedure is repeated, starting at point r, to find the second, third, and subsequent segments of unimpeded motion. In effect, the above procedure measures position deviation from representative trajectory equations to determine the occurrence of a point of interaction.

Representative trajectory equations for contiguous segments of unimpeded motion, determined as above, intersect each other at a point of intersection. A point of interaction, (a.k.a., point of alteration) is an approximation of the point between segments of unimpeded motion at which the ball strikes or is struck by the court surface, the net, or a player's racquet, which point of interaction is derived from the point of intersection. Some three-dimensional position data points may be missing due to loss of contrast between a ball in active play and the video background, an inability to track a ball in active play because it exits the anticipated field of view of a video camera or cameras, an inability to track a ball due to excessive video background motion, or degradation of system video equipment. Missing data points do not pose significant difficulty with the operation of the present invention since a trajectory equation is simply the best fit equation for a given number of three-dimensional data points. Therefore, if data points are missing during a segment of unimpeded motion represented by a homogeneous equation, the missing data points are assumed to conform to and support the best fit equation for the data points which do exist. If the result of step 240 is affirmative and three-dimensional data points are missing near or at a point of alteration, then in accordance with step 245, the equation describing trajectory for the segment of unimpeded motion preceding the point of alteration in question and the equation describing trajectory for the segment of unimpeded motion succeeding the point of alteration in question are compared and solved to find a calculated time and position at which the point of alteration occurred. As each equation describing ball trajectory during a segment of unimpeded motion is developed, it is temporarily stored for use at the microprocessor, in accordance with step 250.

Since each point of interaction is identified and the segments of unimpeded motion between sequential points of interaction are known, ball position during a sequence of active play is known and an animated three-dimensional version of ball position can be reconstructed. However, in step 255, those points of interaction that are attributable to player interaction with the ball during active play are additionally identified. Knowing which points of interaction are attributable to player interaction allows for a reconstruction of an animated version of the game to reproduce player intervention when appropriate. That is, an animated player in the game reproduction strikes the ball at a specific point of interaction if and only if a specific point of interaction is attributed to a player striking the ball. The determination as to whether a point of interaction is attributable to player intervention is made by a comparison of ball trajectories before and after a point of interaction, considering velocity vectors, position of the point of interaction relative to the ground, net, poles, and anticipated location of a player. A space-time point of interaction, P, is attributed to player intervention if one of the following conditions exist: (i) the absolute value of the velocity of the ball after P is greater than the absolute value of the velocity of the ball immediately prior to P, or (ii) the coordinate of P related to height is above court level and the trajectory deviation is not attributable to the proximity of ball position in relation to the position of the net or the poles, or (iii) the coordinate of P related to height is at court level, is not attributable to the position of poles, and the equation describing motion after P is markedly distinguishable from the motion predicted as a result of a reflection from the court. If a specific point of interaction is attributable to player intervention, that point of interaction is flagged at the microprocessor and stored to trigger an animated player interaction with the ball at that specific point of interaction during the creation of a synthetic animation of the actual live action game. Information derived from the above calculations can be stored in a variety of mediums because of the high degree of compression represented by reducing a representation for motion to a group of equations and a group of points in time.

Having determined the trajectories of the ball and the points of interaction attributable to players, a three-dimensional animated version of a live action game is reconstructed in accordance with step 260. The technology to create program driven animation based on a sequence of parameters is well known to those skilled in the art. The present invention's animation program simulates the live action game based upon the previously determined game parameters; points of interaction, points of interaction that are attributable to player interaction, and the trajectory equations describing ball motion during each segment of unimpeded motion. The program animates appropriate ball motion, player interaction, racquet speed and angle, and other variables consistent with game physics and human ergonomics. Animation techniques utilized in the present invention are equivalent to those used in the design of video games and are well known to those skilled in the art. Video games receive control input parameters directly from a player interface whereas the present invention substitutes calculated values of points of interaction, points of interaction attributable to player interaction, and trajectory equations instead of the player interface associated with video games.

In one exemplary embodiment of the present invention, articulated three-dimensional models of player bodies are created using three-dimensional modeling or body scanning techniques. In addition, three-dimensional motion sequences are obtained by recording body movements of live tennis players, using motion capture technology. Such technology is provided, for example, by Motion Analysis Corporation, Santa Rosa, Calif., or desired sequences are generated by the BioVision Motion Capture Studios, San Francisco, Calif. Motion sequences are collected for players running, for racquet swing, and for strike motions. These sequences are then scaled to fit the anatomy of the created player body models.

To animate the motions of a player, motion sequences for running, racquet swings, and strikes are selected and assembled together, to approximately match the points of interaction attributed to player intervention. The final composite motion sequences then are applied to the created player models. This type of technology is well known to those skilled in the art and have been used for character animation in computer games by companies such as EA Sports, Atari, Interplay, Acclaim, Crystal Dynamics, and others. A real time rendering of a synthesized game can be presented over a personal computer or an even greater degree of graphical realism can be achieved utilizing a Silicon Graphics, Inc. (SGI) Onyx or similar platform.

Using points of interaction, attributing points of interaction to player interaction, and describing ball motion with trajectory equations, the present invention is able to synthesize and display an animated portion of a game. Animation is possible from any angle or perspective chosen. For example, a synthesized game may be selected to be viewed from the perspective of one of the players, from the position of a line judge, or from any other location. Although not required, ball speed and other motion statistics are available for display on the monitor concurrently with a display of the animated game.

Another embodiment of the present invention, in addition to tracking ball position, also tracks player position within the field of view. Tracking player position, based on techniques well known in the art and described in a paper entitled "A Camera Based System for Tracking People in Real Time" presented at the International Conference on Pattern Recognition in Vienna, Austria in August, 1996, adds an extra element of realism to the animated version of a live action game. In an embodiment that tracks ball position and player position, the animation program possesses information regarding actual player position and therefore will animate players during a synthesis of the live action game at the positions actually maintained during the live action game. Player position information in relation to ball position at a point of interaction is also used to determine whether a player in the actual game used a backhand or forehand to strike a ball and therefore animation of the appropriate stroke is utilized in the synthetic version of the game. In an embodiment of the present invention which tracks player position and ball position, the microprocessor stores and transmits additional data describing player position in time along with the previously described trajectory equations.

Another embodiment of the present invention, in addition to tracking ball and player positions, also tracks a player's hand and racquet position. Tracking body, extremity, and racquet positions, using a similar technique to that described above in relation to tracking player position, adds a further element of realism to the animated version of a live action game. An embodiment that tracks ball position, player position, and player extremity and racquet positions utilizes additional fields to maintain the new information. Even so, tracking information representing the essence of a game is in a highly compressed form and requires less than twenty Kbits/sec for proper transmission and synthesis of an animated version of a live game.

One embodiment of the present invention utilizes game tracking data to synthesize an animated version of a live action game sequence for use in conjunction with a live televised broadcast of the game. A synthesized replay of a particularly interesting or controversial sequence of game play, rendered in high quality animation, is used in conjunction with conventional video of the event. The point of view of a replay is designated from any position or angle. Thus, in effect, a virtual camera is created which is operable to provide particularly insightful views with various virtual camera pseudo-locations for a synthesized animation of a game or game sequence. The broadcaster determines a virtual camera pseudo-location which provides the best view or angle from which to view a synthesized animated game sequence. The broadcaster further specifies the desired synthesized replay speed. The virtual camera is also operable as if it were a moving camera, its pseudo-path variable even within a sequence of play. One especially interesting possibility is to direct the virtual camera to synthesize an animated version of a game from a constantly changing pseudo-location corresponding to the eyes of a player.

The present invention may also be utilized as an officiating tool in those sports that allow review of an official's live ruling or determination through the review of video tape of a sequence of play. Actual video is still contemplated as being used, but in those situations when an appropriate view from an video camera is not available, the present invention is utilized and a pseudo-location is prescribed which allows the best view of the controversial game or match segment.

The present invention is also applicable for use over the Internet. Current modems, able to transmit data at greater than twenty Kbits/sec, are more than adequate to transmit the tracking data associated with a synthetic game. Tracking data is transmitted to WWW servers made available to subscribers. The tracking data can be multicast over the Internet live, or in the alternative, a subscriber can access a data base containing the tracking data at any convenient time. Another embodiment of the present invention further transmits a "play-by-play" audio track and calculated statistics (such as ball speed, player speed, etc.) along with the tracking data used to synthesize the animated game. Software to support the synthesis of an animated game from the transmitted tracking data is present at the PC of the subscriber user. Users are able to interact with the animation, that is, a user is able to designate a specific virtual camera's pseudo-location or designate a virtual camera view of the game from the perspective of one of the players.

Another embodiment of the present invention stores the tracking data from a plurality of games on a suitable storage device (such as a floppy disk or CD-ROM). A user installs a viewer program on a PC and accesses a desired synthetic game file from the floppy disk or CD-ROM. Again, users are able to interact with the animation, that is, a user is able to designate a specific virtual camera's pseudo-location or designate a virtual camera view of the game from the perspective of one of the players.

Although the present invention is particularly well suited for the synthetic animation of a tennis game, and is so described with respect to this application, it is equally applicable for use with any trajectory of a ball, puck, or other object that can be reduced to the form of an equation or series of equations. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for synthesizing an animation of object motion utilizing a plurality of video cameras and at least one digital processor, said object motion capable of description with at least one object trajectory, said method comprising the steps of:

generating a plurality of sequential three-dimensional positions for an object;

concatenating said plurality of sequential three-dimensional positions into at least one segment of unimpeded motion, each of said at least one segment of unimpeded motion commencing and terminating with a point of interaction;

generating a trajectory equation for each of at least one segment of unimpeded motion;

determining a point of intersection for two sequential trajectory equations representing two respective segments of unimpeded motion; and utilizing said point of intersecting as said point of interaction when generation of said plurality of sequential three-dimensional positions for said object is interrupted contemporaneously with the occurrence of said point of interaction; and synthesizing said animation utilizing each of said trajectory equations and each of said points of interaction as animation variables.

2. The method in accordance with claim 1 wherein a plurality of objects in motion are tracked and reduced to a respective plurality of trajectory equations, said respective plurality of trajectory equations utilized as animation variables.

3. The method in accordance with claim 1 further comprising the step of:

storing said at least one trajectory equation within a storage medium enabling subsequent animation utilizing each of said at least one trajectory equation.

4. The method in accordance with claim 3 wherein said storage medium is a CD-ROM.

5. A method for synthesizing an animated version of a live action game utilizing a plurality of video cameras and at least one digital processor, said live action game including an object, said object having at least one object trajectory as an integral component of said live action game, said method comprising the steps of:

tracking a sequence of two-dimensional positions of said object with at least two of said plurality of video cameras during periods of active play;

triangulating a plurality of sequential three-dimensional positions over time for said object utilizing said two-dimensional positions of said object resulting from said at least two of said plurality of video cameras;

concatenating said plurality of sequential three-dimensional positions into at least one segment of unimpeded motion, each of at least one segment of unimpeded motion commencing and terminating with a point of interaction;

representing each of at least one segment of unimpeded motion with a trajectory equation;

determining, from a plurality of points of interaction, which of said plurality of points of interaction are attributable to player interaction; and synthesizing said animated version of said live action game with an animation program resident at one of said at least one digital processor, said animation program utilizing each of said points of interaction, points of interaction attributable to player interaction, and trajectory equations as animation variables.

6. The method in accordance with claim 5 wherein at least one of said plurality of cameras are mounted in a fixed configuration.

7. The method in accordance with claim 5 wherein at least one of said plurality of cameras are mounted in a movable configuration.

8. The method in accordance with claim 5 wherein a plurality of objects in motion are tracked and reduced to a respective plurality of trajectory equations, said respective plurality of trajectory equations utilized as animation variables.

9. The method in accordance with claim 5 wherein at least one player's position is tracked in time in addition to said object.

10. The method in accordance with claim 9 wherein at least one player's extremity position is tracked in time in addition to said at least one player position.

11. The method in accordance with claim 5 wherein said animated version of said live game action is operable to be viewed from a virtual camera at a user defined pseudo-location.

12. A method for synthesizing an animated version of a live action tennis match utilizing a plurality of video cameras and a microprocessor, said method comprising the steps of:

tracking a sequence of two-dimensional positions for a tennis ball, with at least two of said plurality of video cameras, during periods of active play;

triangulating a plurality of sequential three-dimensional positions over time for said tennis ball utilizing said two-dimensional positions for said tennis ball attributable to said at least two of said plurality of video cameras;

concatenating said plurality of sequential three-dimensional positions into at least one segment of unimpeded motion, each of at least one segment of unimpeded motion commencing and terminating with a point of interaction;

representing each of at least one segment of unimpeded motion with a trajectory equation;

determining, from a plurality of points of interaction, which of said plurality of points of interaction are attributable to player interaction; and synthesizing said animated version of said live action tennis match with an animation program running on said microprocessor, said animation program utilizing each of said points of interaction, points of interaction attributable to player interaction, and trajectory equations as animation variables.

13. The method in accordance with claim 12 further comprising the step of storing each of said points of interaction, points of interaction attributable to player interaction, and trajectory equations within a storage medium enabling subsequent animation.

14. The method in accordance with claim 13 wherein said storage medium is a CD-ROM.

15. The method in accordance with claim 12 wherein said plurality of cameras are mounted in a fixed configuration.

16. The method in accordance with claim 12 wherein said plurality of cameras are mounted in a movable configuration.

17. The method in accordance with claim 12 wherein at least one player's position is tracked in time in addition to said tennis ball.

18. The method in accordance with claim 17 wherein at least one player's extremity position is tracked in time in addition to said at least one player position.

19. The method in accordance with claim 18 wherein at least one player's racquet position is tracked in time in addition to said at least one player position.

20. The method in accordance with claim 12 wherein said animated version of said live action tennis match is operable to be viewed from a virtual camera at a user defined pseudo-location.

21. A system for synthesis of an animated version of a live action tennis match comprising:

a plurality of video cameras, at least two of said plurality of video cameras tracking a sequence of two-dimensional positions for a tennis ball during periods of active play;

means for transmitting said sequence of two-dimensional positions from said plurality of video cameras to a digital processor;

means for triangulating a plurality of sequential three-dimensional positions for said tennis ball from said sequence of two-dimensional positions of said tennis ball;

means for concatenating said plurality of sequential three-dimensional positions into at least one segment of unimpeded motion each of said at least one segment of unimpeded motion commencing and terminating with a point of interaction;

means for assigning a representative equation to each of said at least one segment of unimpeded motion;

means for determining a point of intersection for two sequential trajectory equations representing two respective segments of unimpeded motion;

means for utilizing said point of intersection as said point of interaction when generation of said plurality of sequential three-dimensional positions for said object is interrupted contemporaneously with the occurrence of said point of interaction; and means for animating a synthetic version of said live action tennis match utilizing each of said representative equations assigned to each of said at least one segment of unimpeded motion and each of said points of interaction.

22. The system as recited in claim 21 further comprising means for tracking at least one player's position to provide for accurate player position during a subsequent animation of said synthetic version of said live action tennis match.

23. The system as recited in claim 22 further comprising means for tracking at least one player's extremity to provide for accurate extremity position during a subsequent animation of said synthetic version of said live action tennis match.

24. The system as recited in claim 22 further comprising means for tracking at least one player's racquet position to provide for accurate racquet position during a subsequent animation of said synthetic version of said live action tennis match.

* * * * *